Figure 1:
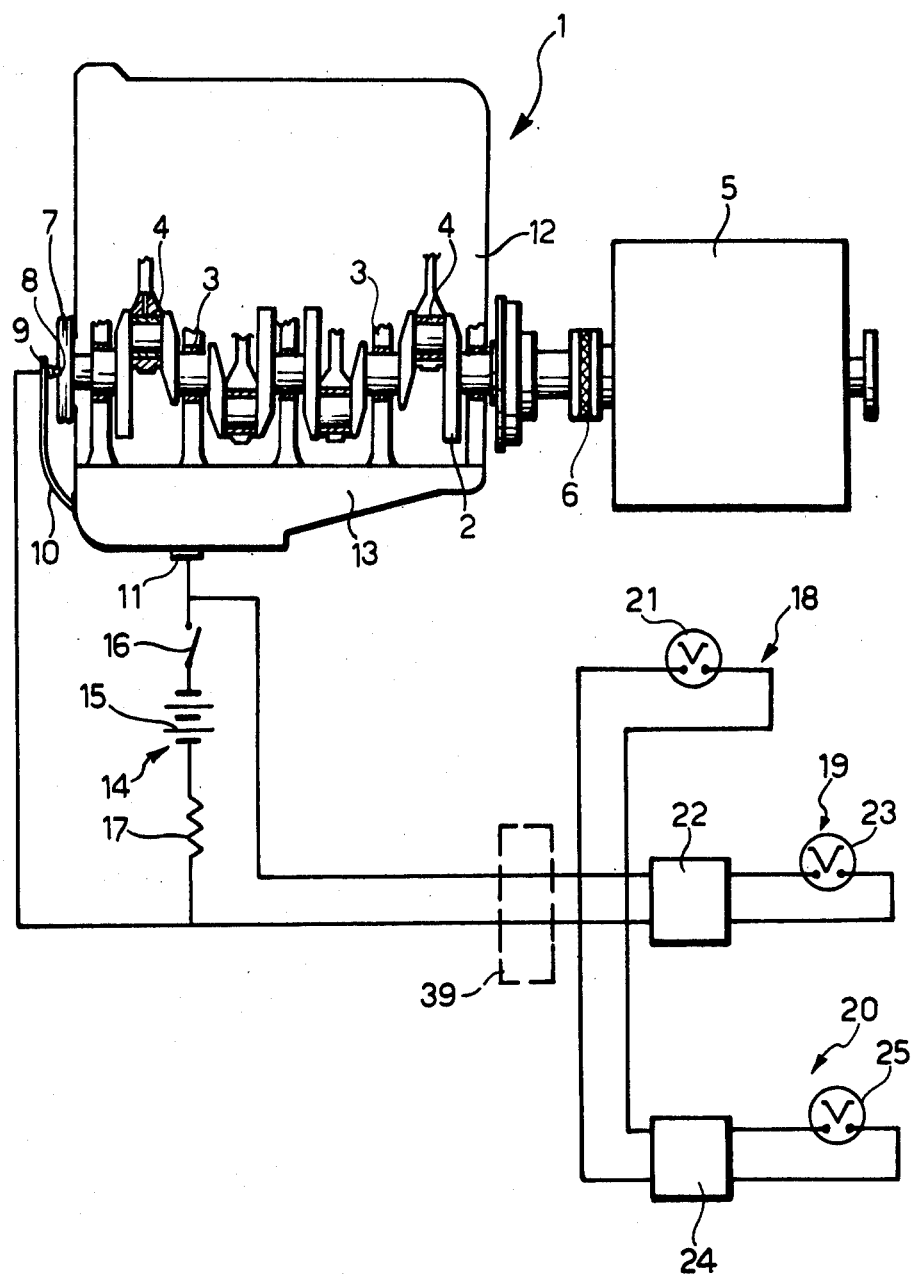

United States Patent [19]

Bassoli et al.

[11] 4,109,506

[45] Aug. 29, 1978

[54] DEVICE FOR MONITORING THE LUBRICATION OF THE CRANKSHAFT OF A RECIPROCATING INTERNAL COMBUSTION ENGINE

[75] Inventors: Cesare Bassoli; Giorgio Cornetti, both of Turin, Italy

[73] Assignee: FIAT Societa per Azioni, Turin, Italy

[21] Appl. No.: 851,565

[22] Filed: Nov. 14, 1977

[30] Foreign Application Priority Data

Dec. 2, 1976 [IT] Italy .............................. 69882 A/76

[51] Int. Cl.² .......................................... G01M 15/00
[52] U.S. Cl. ..................................... 73/10; 73/119 R
[58] Field of Search ........................ 73/119 R, 10, 64; 324/65 R

[56] References Cited

U.S. PATENT DOCUMENTS

| 3,457,504 | 7/1969 | Arthur et al. | 324/65 R |
| 4,000,656 | 1/1977 | Moioli | 73/10 X |

Primary Examiner—Jerry W. Myracle
Attorney, Agent, or Firm—Sughrue, Rothwell, Mion, Zinn and Macpeak

[57] ABSTRACT

A device for testing the lubrication of an internal combustion engine has a potentiometer circuit connected between two electrodes one in contact with the crankshaft and the other in contact with the crank case, a first voltage detector of the averaging type connected directly across the potentiometer and at least one further voltage detector of the averaging type connected to a threshold discriminator which is also connected across the potentiometer; a third averaging voltage detector may be connected to a further threshold discriminator connected across the potentiometer, this latter having a threshold set at a value different from that of the first mentioned discriminator: alternatively the first mentioned discriminator may be one having two thresholds to each of which it can be switched at will.

5 Claims, 4 Drawing Figures

DEVICE FOR MONITORING THE LUBRICATION OF THE CRANKSHAFT OF A RECIPROCATING INTERNAL COMBUSTION ENGINE

The present invention relates to a device for monitoring the lubrication of the crankshaft of a reciprocating internal combustion engine.

In Italian Patent Application No. 69384-A/76 there is described a device for monitoring the lubrication of a reciprocating internal combustion engine incorporating an electric circuit having electrodes which are in contact one with the engine block and the other with the crankshaft of the engine. The circuit includes an averaging voltmeter, the indication of which, according to whether it is above or below a predetermined threshold, serves to define in general terms whether the lubrication of the engine is satisfactory or not inasmuch as this indication depends upon the electrical resistance of the oil in the lubricating channels between the crankshaft and the main bearings and big end bearings.

The voltage signal across the terminals of this circuit is fed to a first channel of an oscilloscope, having two other channels to one of which there is fed the signal from a pressure transducer sensitive to the pressure in one of the cylinders of the engine, while to the other channel there is fed a frequency signal derived from the speed of rotation of the engine.

Using a system such as that described above it is possible to check the general state of an engine being tested; and such a system can be used as an aid in diagnosing the causes of any possible defects in the engine, but it does not provide a quantitative output by means of which a precise determination or computation of the degree of efficiency of the engine lubrication can be obtained, the only quantitative indication being that of the averaging voltmeter.

A quantitative indication of this nature would be useful, however, both for the purpose of deciding if an engine can continue to operate without damage, and also for making experimental alterations for improving the design of the engine lubrication circuit.

This present invention seeks to provide a device for monitoring the lubrication of an internal combustion engine, which can give an immediate quantitative indication either as an electrical signal or as a readout display of the efficiency of the lubrication of the engine.

According to the present invention a device for monitoring the lubrication of the crankshaft of a reciprocating internal combustion engine, connectable to a potentiometer circuit which has two electrodes one connected electrically to the said crankshaft and the other connected electrically to the engine block, and including at least a first detector unit having an average value voltage detector, is characterised in that it also includes a second detector unit connected in parallel with the said average value voltage detector and comprising a threshold discriminator circuit the output of which is connected to a second average value voltage detector.

Figure 2:
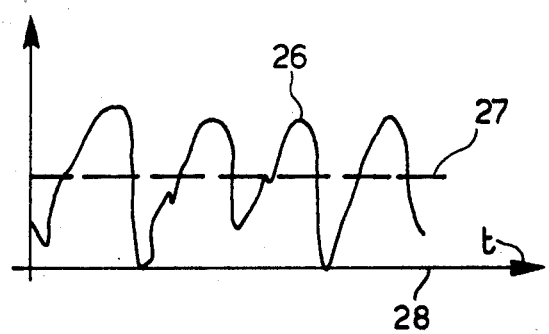
Figure 3:
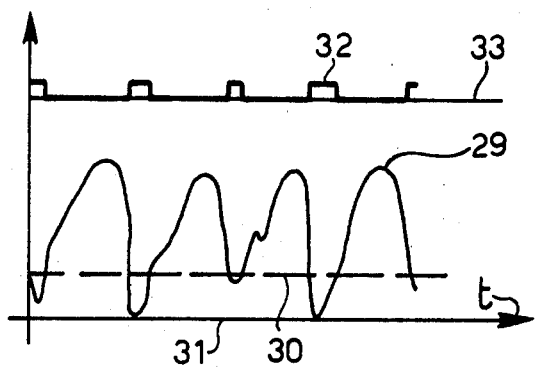
Figure 4:
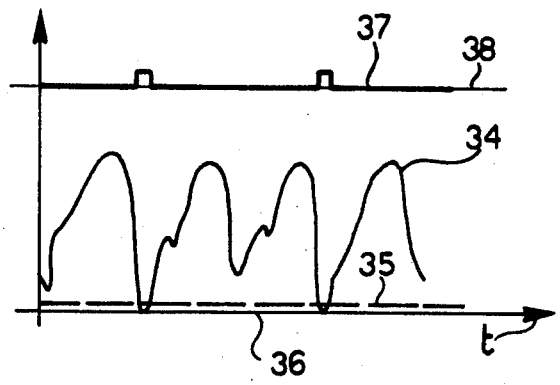

One embodiment of the present invention will now be more particularly described, by way of example, with reference to the accompanying drawings, in which:

FIG. 1 is a schematic diagram illustrating a reciprocating internal combustion engine fitted with a system for monitoring the lubrication thereof incorporating a device formed as an embodiment of the invention; and FIGS. 2, 3, and 4 are diagrams illustrating the form of the signals present in different parts of the device during operation thereof.

Referring now the drawings, and particularly to FIG. 1, there is shown schematically a reciprocating internal combustion engine of the four stroke type having four cylinders set up for inspection on a test bed and connected to a braking device 5. In FIG. 1 the schematic representation of the engine 1 illustrates particularly the crankshaft 2 of the engine 1, with its associated bearings 3, and big end bearings 4.

The crankshaft 2 of the engine is connected, at its forward end (to the right of FIG. 1) with an inspection brake or dynamometer 5.

Coupling between the crankshaft 2 and the shaft of the inspection brake 5 should preferably be effected in such a way that the engine and the brake are electrically insulated from each other.

For the purpose there may be interposed between the coupling flanges as shown in FIG. 1, a disc 6 of insulating material, and the coupling flanges may be joined, in a known way, by bolts fitted with insulating sleeves which are not illustrated in the Figure.

At its end remote from the inspection brake 5, the crankshaft 2 is fitted with a pulley 7 which has in the centre of its exposed face, that is the face directed away from the engine, a recess or notch into which there is pressed a ball 8 which is in permanent contact with a contact element 9 made of carbon or some other electrical conductor material kept under pressure against the ball 8 by a spring 10 insulated from the engine.

A second fixed contact 11 is connected to the cylinder block 12 of the engine; in the embodiment illustrated the second fixed contact is fitted to the oil sump 13.

Between the contact 9 and the contact 11 there is connected a potentiometer circuit 14 comprising a battery or other electric current source 15, which can with advantage be a stabilised power supply, connected between the contacts 9 and 11 by means of a switch 16 and a precision load resistance 17.

Also between the contacts 9 and 11, that is in parallel across the potentiometer circuit 14, there is connected a set of three detector units indicated 18, 19 and 20 in parallel with each other.

The first of these detector units comprises an average value millivoltmeter 21, the second unit 19 comprises a critical level discriminator 22, the output of which is connected to an average value millivoltmeter 23, while the third unit comprises a discriminator 24 the output of which is connected to an average value millivoltmeter 25.

The discriminators 22 and 24 consist of threshold circuits of a known type the outputs of which are signals at logic level 1 or 0, according as the signal at their input is less than or greater than a predetermined critical threshold level.

In the present invention the voltage threshold of the discriminator 22 is set at a higher level than the voltage threshold of the circuit 24, the latter being set at a value a little above zero.

The operation of the monitoring device described above is as follows:

The millivoltmeter 21 detects the voltage drop across the load resistor 17, the voltage source 15 and the swich 16 of the potentiometer circuit 14; this signal is shown as the curve 26 plotted on the ordinate against time $t$, in FIG. 2; the broken line 27 shows the average value of this signal, which corresponds to the value indicated by the millivoltmeter 21; the zero line is indicated 28.

If the reading of the millivoltmeter 21 is less than a predetermined value, this means that the voltage across the terminals of the potentiometer circuit 14 is low, and thus that the current which flows through it is high; this indicates that the resistance of the whole circuit, including the lubricating oil film which should be interposed between the crankshaft 2 and the engine block, in the main bearings 3 is low, which means that the lubricant channels are thin, and hence the lubrication is defective.

If, on the other hand, the average voltage indicated on the millivoltmeter 21 is greater than the said threshold, then this means that the lubrication is being carried out well.

FIG. 3 illustrates the form of the signals produced by the detector unit 19, again plotted against the time $t$. The curve 29 of FIG. 3 represents the input signal to the unit, this signal being the same as the previously discussed signal 26 being the instantaneous voltage across the potentiometer circuit 14. The input signal is fed to the discriminator 22 the critical threshold of which is indicated by the broken line 30 of FIG. 3. The zero line is indicated at 31.

The discriminator 22 provides, at its output, a signal 32, the logic zero level of which is indicated 33 in FIG. 3. The logic zero output is produced when the signal 29 is above the critical threshold value 30, whilst the logic 1 output signal is produced when the signal 29 is below the said critical value. The duration of the logic level 1 impulses of the signal 32 depends, therefore, upon the proportion of the total time for which the signal 29 is below the critical threshold value of the discriminator 22.

The average value of the signal 32 will thus provide an indication of this proportion. This average value is provided by the millivoltmeter 23 to which the output of the discriminator 22 is applied; being an average value instrument it gives an indication representative of the proportion of the total time during which the signal 29 is less than the critical threshold value 30. This threshold is determined experimentally as that value below which the lubrication is known to be faulty, and it varies for different types of engine.

The detector unit 19 therefore gives a direct readout indicating whether the lubrication of the engine is satisfactory or faulty. It is necessary, however, to determine experimentally, for every type of engine, the proportion of time for which the signal must remain above the critical threshold, below which proportion the lubrication efficiency of the engine is no longer acceptable.

Finally, FIG. 4 is a diagram illustrating the signals occurring in the detector unit 20, plotted on the ordinate against the time $t$. Again, the input signal 34 is identical to the signal 26, which represents the instantaneous value of the voltage drop across the potentiometer circuit 14. This signal 34 is fed to a zero discriminator 24, the threshold of which is set at a low value, indicated by the broken line 35 in FIG. 4, near to zero, whilst the zero level itself is indicated in FIG. 4 by the line 36.

The discriminator 24 provides at its output a logic signal 37, the zero level of which is indicated at 38; the signal 37 is at logic 0 level when the signal 34 is above the critical value 35, and is at logic level 1 whenever the signal 34 is below the critical value 35.

The duration of the logic level 1 impulses of the signal 37 thus represents the proportion of the total time during which the signal 34 is below the critical value. Again, therefore, the average value of the signal 37 can be used to represent the proportion of the total time for which the signal 34 is below the threshold 35.

For this the output signal from the discriminator 24 is fed to the average value millivoltmeter 25 which thus gives a direct reading representing the proportion of time during which the signal 37 is less than the critical value 35.

This critical value is determined experimentally so that when the signal 34 falls below it the lubrication is clearly faulty in the sense, for example, that either one lubricating channel is broken, or that there is a serious blockage in the lubrication circuit caused, for example, by the presence of shavings.

For accurate operation of the monitoring device of the invention, in which the voltage signals applied to the detector units are inversely proportional to the current circulating through the potentimometer circuit and the lubricating channels, it is advisable for the load resistance 17 of the potentiometer circuit to be very large in relation to the resistance of the rest of the circuit including the lubricating channels so that in the operating region the behaviour of these circuits will be linear as far as is practically possible.

The device of the present invention described above can also be advantageously modified if the drive transmission of the crankshaft is effected by means of gears, by the provision of a filter such as that indicted 39 and shown in broken outline in FIG. 1. In fact, it will be appreciated that the voltage signal across the potentiometer 14 includes oscillating components due, among other things to the behaviour of the transmission gears.

If the filter 39 is suitably tuned then the oscillating components due to the transmission gears can be eliminated, or else separated from the remainder of the signal, for analysing the behaviour of the said transmission gears, and that of their shafts and bearings.

Instead of providing two independent discriminator circuits 22, 24, it would be possible to use a single discriminator having two separate thresholds corresponding to those of the discriminators 22 and 24. By switching such a discriminator successively between these two thresholds, it would be possible to provide two successive readings of the proportion of time during which the signal from the potentiometer circuit is less than each of the values of the said two thresholds.

We claim:
1. In a device for testing the lubrication of the crankshaft of a reciprocating internal combustion engine, said device being connectable to a potentiometer circuit having first and second electrodes, said first electrode being connected electrically to said crankshaft and said second electrode being connected electrically to the engine block, said device including at least a first detector unit including an averaging voltage detector,
the improvement wherein:
said device also inlcudes a second detector unit,
means connecting said second detector unit in parallel with said averaging voltage detector across said potentiometer circuit, said second detector unit comprising a first threshold discriminator circuit, and
a second averaging voltage detector, connected to the output from said threshold discriminator circuit.

2. The device of claim 1, further including a third detector unit, means connecting said third detector unit in parallel to said first detector unit, said third detector unit comprising:

a second threshold discriminator having a threshold level set at a value differing from that of said first threshold discriminator of said second unit.

3. The device of claim 2, further comprising an electrical filter circuit connected between said potentiometer and said first, second and third detector units.

4. The device of claim 1, wherein said first threshold discriminator of said second detector unit is a device having two separate threshold levels, and means for switching said first threshold discriminator to operate at one or the other threshold level thereof.

5. The device of claim 1, further comprising an electrical filter circuit connected between said potentiometer circuit and said first and second detector unit.

* * * * *